United States Patent
Lee et al.

(10) Patent No.: US 10,271,113 B2
(45) Date of Patent: Apr. 23, 2019

(54) CHASSIS SWITCH USING DISTRIBUTED BACKPLANE TO INTERCONNECT LINE CARDS

(71) Applicant: Alpha Networks Inc., Hsinchu (TW)

(72) Inventors: Chung-Wang Lee, Hsinchu (TW); Chi-Yung Ko, Hsinchu (TW)

(73) Assignee: ALPHA NETWORKS INC., Hsinchu (TW)

( * ) Notice: Subject to any disclaimer, the term of this patent is extended or adjusted under 35 U.S.C. 154(b) by 295 days.

(21) Appl. No.: 15/181,456

(22) Filed: Jun. 14, 2016

(65) Prior Publication Data

US 2017/0188480 A1    Jun. 29, 2017

(30) Foreign Application Priority Data

Dec. 24, 2015   (TW) .............................. 104143561 A

(51) Int. Cl.
*H04L 12/66*    (2006.01)
*H04Q 1/02*    (2006.01)
*H04Q 1/00*    (2006.01)

(52) U.S. Cl.
CPC ................. *H04Q 1/15* (2013.01); *H04Q 1/00* (2013.01)

(58) Field of Classification Search
CPC ................................... H04Q 1/15; H04Q 1/00
USPC .................................................. 370/463, 464
See application file for complete search history.

(56) References Cited

U.S. PATENT DOCUMENTS

| | | | |
|---|---|---|---|
| 6,834,058 B1* | 12/2004 | Moyal | H04L 25/14 370/503 |
| 9,059,901 B1* | 6/2015 | Kumar C S | H04L 45/02 |
| 9,253,074 B1* | 2/2016 | Kumar C S | H04L 45/02 |
| 9,485,198 B1* | 11/2016 | Kumar C S | H04L 45/02 |
| 2002/0023184 A1* | 2/2002 | Paul | G06F 11/2007 710/100 |
| 2014/0019659 A1* | 1/2014 | Avimor | G06F 13/4068 710/301 |
| 2014/0269738 A1* | 9/2014 | Pierson | H04L 49/35 370/400 |
| 2017/0188480 A1* | 6/2017 | Lee | H04Q 1/15 |

* cited by examiner

*Primary Examiner* — Chuong T Ho
(74) *Attorney, Agent, or Firm* — Bacon & Thomas, PLLC

(57) ABSTRACT

The present invention is to provide a chassis switch, which comprises a chassis for accommodating a designated number of line cards therein; a backplane installed on the back side of the chassis and having a plurality of connectors disposed thereon; at least one line card plugged into one of the connectors corresponding thereto via a front side of the chassis and each having an access switch chip adapted to switch local network signals and an interconnect switch chip adapted to switch the signals between ports of the at least one line card; and a loop adapted to connect the corresponding ports of the access switch chip and the interconnect switch chip respectively through the connectors, so as to enable each line card plugged into the chassis switch to perform a local network switching function and a switching function between the at least one line card.

4 Claims, 19 Drawing Sheets

CHASSIS SWITCH USING DISTRIBUTED BACKPLANE TO INTERCONNECT LINE CARDS

FIELD OF THE INVENTION

The present invention relates to a chassis switch, more particularly to a chassis using a distributed backplane to interconnect ports of line cards disposed thereon so that, when the amount of the line cards plugged into the chassis switch is less than a designated full number, the ports of each line card are still able to realize the local network switching function and the switching function between the ports and make the network traffic on the chassis switch being operated in a full-speed and non-blocking condition at a lowest construction cost.

BACKGROUND OF THE INVENTION

Please refer to FIG. 1. The chassis switch 10 is a server whose appearance is designed according to a uniform standard, so as to cooperate with a chassis 10 for using. The major design objective is to reduce the space occupied by the server possibly, so as to obtain an advantage of reducing the cost while the server is deposited in a rental machine room. Besides, because the appearance and the design of the chassis switch 10 have the uniform standard, it may have a better cooperativeness and manageability. In general, the width of the chassis switch 10 may be nineteen inches, and the height thereof is in a unit of U, where 1 U=1.75 inch=44.45 cm. The standard servers may have several heights, including 1 U, 2 U, 3 U, 4 U, 5 U and 7 U. The size of the chassis 11 also applies a universal industry standard and it may vary from 22 U to 42 U. A removable sliding trailer may be disposed inside the chassis 11 according to the height of U, so that users may flexibly adjust the height of the chassis based on the height of the server for placing network equipment, such as the server, hub, disk array cabinet and so on, therein. After the server is placed inside the chassis, all I/O lines of the server are pulled out from a back side of the chassis 11, where all interfaces of the chassis switch 10 are located at the back side as well. All I/O lines are deposited in trunkings of the chassis 11. In general, each of the I/O lines is labelled for easy management. The chassis switch 10 is suitable for the person who has the demand for a large quantity of the servers, for example an internet company requiring a centralized management.

Please refer to FIG. 1. Basic elements of a traditional chassis switch 10 at least include a plurality of line cards 12, a backplane 13 and at least one switch card 14, wherein the backplane 13 is installed on the back side of the chassis 11 and has a plurality of connectors 131 disposed thereon and adapted to be plugged with a designated number of the line cards 12 and the switch card 14. The line cards 12 and the switch card 14 are plugged into the connectors 131 through a front side of the chassis 11, respectively. Therefore, the line cards 12 and the switch card 14 are interconnected by the backplane 13 to switch the network signals with each other. As a result, in order to make all line cards 12 inserted on the traditional chassis switch 10 can be operated in a full-speed performance without being blocked, the backplane 13 needs to have enough bandwidth and high-speed transmission ability.

Please refer back to FIG. 1. Generally speaking, in order to reduce the cost and avoid any idle resource, the user usually buys a chassis 11 and a small quantity of line cards 12 when setting up the chassis network switching system in an early stage. Then, as the demand for the network communication is increased, more line cards 12 are gradually added. However, as the network specification is raised gradually, the signal transmission speed of the line cards 12 also becomes faster, such that the demand for the signal transmission accumulated on the backplane 13 is increased as well. The signal transmission speed of the single backplane 13 cannot go with the one of the line cards 12, so that the single backplane 13 may not enable the line cards 12 to operate in the full-speed performance with the non-blocking or low latency. Therefore, a novel chassis switch is developed and its design is to distribute the signals of the above centralized backplane 13, please refer to FIG. 2, to plural groups of backplane signal lines 132. Thus, the mesh connection for 2-stage fat tree proposed by ANSI/TIA-942-A-1 standard is presented. This kind of switch is named as a chassis switch with a distributed backplane design, and includes the following two features:

1. Please refer to FIG. 1 and FIG. 2. Electronic circuit chips (hereinafter referred to as chips) required for the chassis switch include at least an access switch chip 121 and an interconnection switch chip 141. The access switch chip 121 is assembled on each line card 12, and the interconnection switch chip 141 is assembled on the switch card 14.

2. Based on the access switch chip 121, the network signals received or sent by the I/O port of the line card 12 are switched to the ports of the other line card 12 via the interconnection switch chip 141, so as to form a non-blocking signal switch mechanism.

The chassis switch with thirty-two ports of the fat tree structure is taken as an example. Please refer to FIG. 1 and FIG. 3A. The chassis switch is composed of four line cards 12 which are marked as #0, #1, #2 and #3. The access switch chip 121 of each line card 12 includes a transmission circuit and a receiving circuit, and each of the transmission circuit and the receiving circuit has eight internal ports responsible for transmitting and receiving the signals respectively, where eight external ports are also disposed on the transmission circuit and the receiving circuit correspondingly. Each of the internal ports and the external ports is simply called as a port hereinafter. Therefore, one line card 12 includes eight ports and the four line cards 12 include 32 ports in total. Each of the line cards 12 is adapted for providing a mechanism for switching local network signals, and also responsible for the switching function for I/O ports. The interconnection switch chip 141 of the switch card 14 is responsible for the signals switching between the internal ports of the line cards 12. Please refer to FIG. 3B. The thirty-two backplane signal lines 132 on the backplane 13 are responsible for the connection mechanism between the internal ports of the line cards 12, correspondingly. Thus, the internal ports of the line cards 12 may not only provide the local network signal switching function individually, but also provide the signal switching function between the line cards 12, and an example of the signal switching function is illustrated in FIG. 3C.

The user can just plug some line cards 12 into the chassis switch 10 according to an actual demand rather than plugging a full designated number of the line cards 12 into the chassis switch 10. The chassis switch with thirty-two ports of the above fat tree structure is hereby taken as an example for illustration as follows:

1. Please refer to FIG. 4A and FIG. 4B. When the user only plugs one line card #0 into the chassis switch and the others line cards #1, #2 and #3 are not plugged into the chassis switch at the same time, the four interconnection switch chips 141 of the chassis switch are actually only responsible for the signal switching function between the internal ports of the single access switch chip 121 on the single line card #0, which results in unnecessary expense and resource waste for the arrangement of the interconnection switch chips 141.

2. Please refer to FIG. 5A and FIG. 5B. When the user only plugs two line cards #0 and #1 into the chassis switch and the others line cards #2 and #3 are not plugged into the chassis switch at the same time, the four interconnection switch chips 141 of the chassis switch are actually only responsible for the signal switching function between the internal ports of the two access switch chips 121 on the two line cards #0 and #1, which results in the unnecessary expense and the resource waste for the arrangement of the interconnection switch chips 141.

3. Please refer to FIG. 6A and FIG. 6B. When the user only plugs three line cards #0, #1 and #2 into the chassis switch and the other line card #3 is not plugged into the chassis switch at the same time, the four interconnection switch chips 141 of the chassis switch are actually only responsible for the signal switching function of the internal ports of the three access switch chips 121 on the three line cards #0, #1 and #2, which may result in the unnecessary expense and the resource waste for the arrangement of the interconnection switch chips 141.

Please refer back to FIG. 1. According to the above description, when the amount of the line cards 12 designated on the chassis switch 10 is increased, and the user just plugs some line cards 12 into the chassis switch 10 according to an actual demand rather than plugging the full designated number of the line cards into the chassis, it inevitably results in more unnecessary expense and resource waste for such arrangement of the interconnection switch chips 141.

According to the above, how to design and provide an improved chassis switch based on a circuit loop mechanism of the distributed backplane and capable of performing the local network switching function and the switching function between the line cards by the connectors whose amount is equal to that of the interconnection switch chips, for enabling the network traffic on the chassis switch to be operated in a full-speed and non-blocking condition at a lowest construction cost, is thus the primary objective of the present invention.

SUMMARY OF THE INVENTION

One objective of the present invention is to provide a chassis switch using a distributed backplane to interconnect line cards. In the case that some line cards are plugged into the chassis switch and the amount of the plugged line cards is less than a full designated number, the chassis switch may use a circuit loop mechanism of the distributed backplane to enable the internal ports of the line card on the chassis switch to interconnect to each other according to the user's actual demand, so as to realize the local network switching function and the switching function between the internal ports of the line card.

Another objective of the present invention is that the number of the connectors and interconnection switch chips disposed on a switch card of the chassis is only needed to be the same as the number of the line cards, so that the chassis switch may use the circuit loop mechanism of the distributed backplane to enable the internal ports of the line card on the chassis to interconnect with each other, so as to realize the local network switching function and the switching function between the line cards to meet the user's requirement by implementing the chassis switch at the lowest construction cost.

Another objective of the present invention is to dispose the interconnection switch chip, which is conventionally disposed on the switch card, on each of the line cards. Thus, the chassis switch may use the circuit loop mechanism of the distributed backplane to enable the internal ports of the line card plugged into the distributed backplane to interconnect to each other, so as to realize the local network switching function and the switching function between the line cards and meet the user's requirement by implementing the chassis switch at the lowest construction cost.

DETAILED DESCRIPTION OF THE PREFERRED EMBODIMENTS

Figure 1:
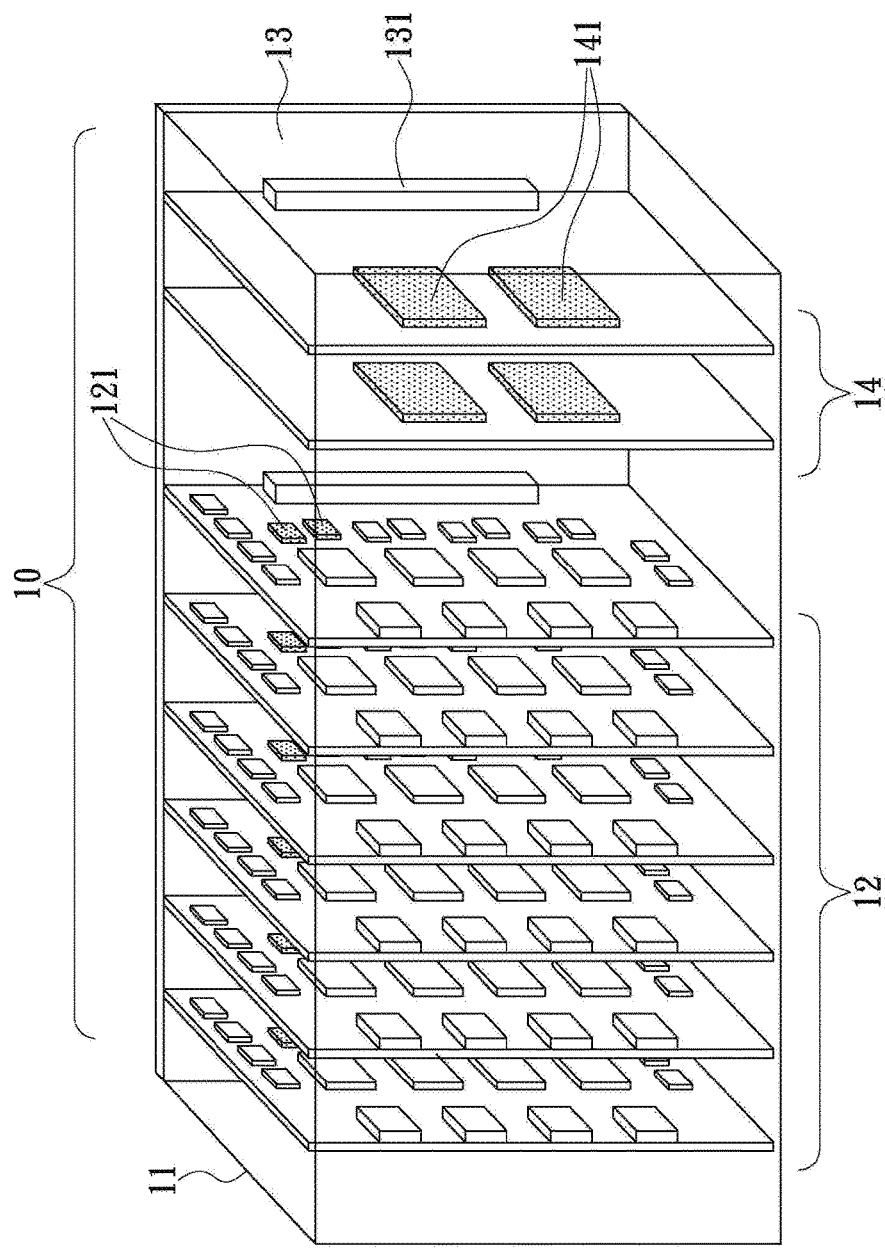
FIG. 1 is a perspective view of a traditional chassis switch.
Figure 2:
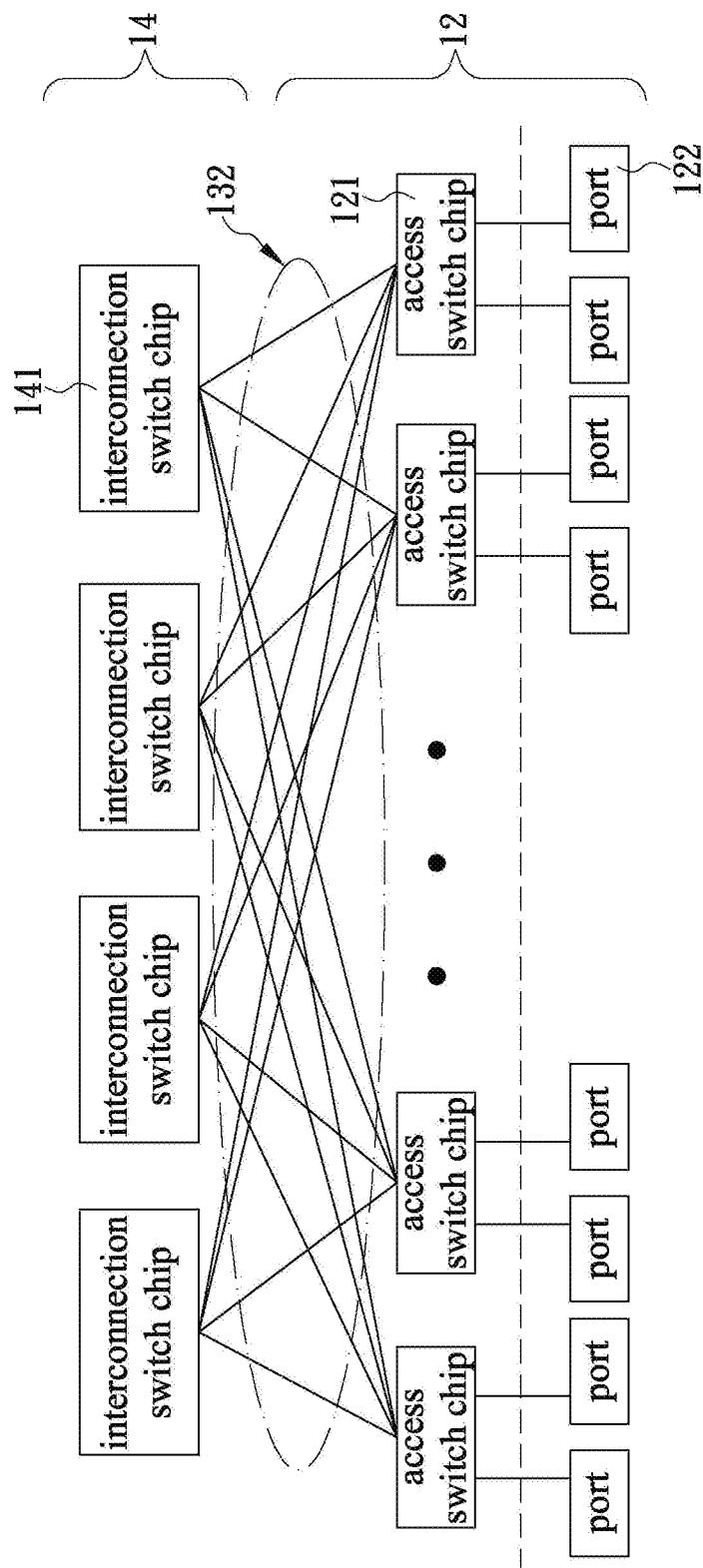
FIG. 2 is a schematic circuit diagram of a traditional chassis switch.
Figure 3A:
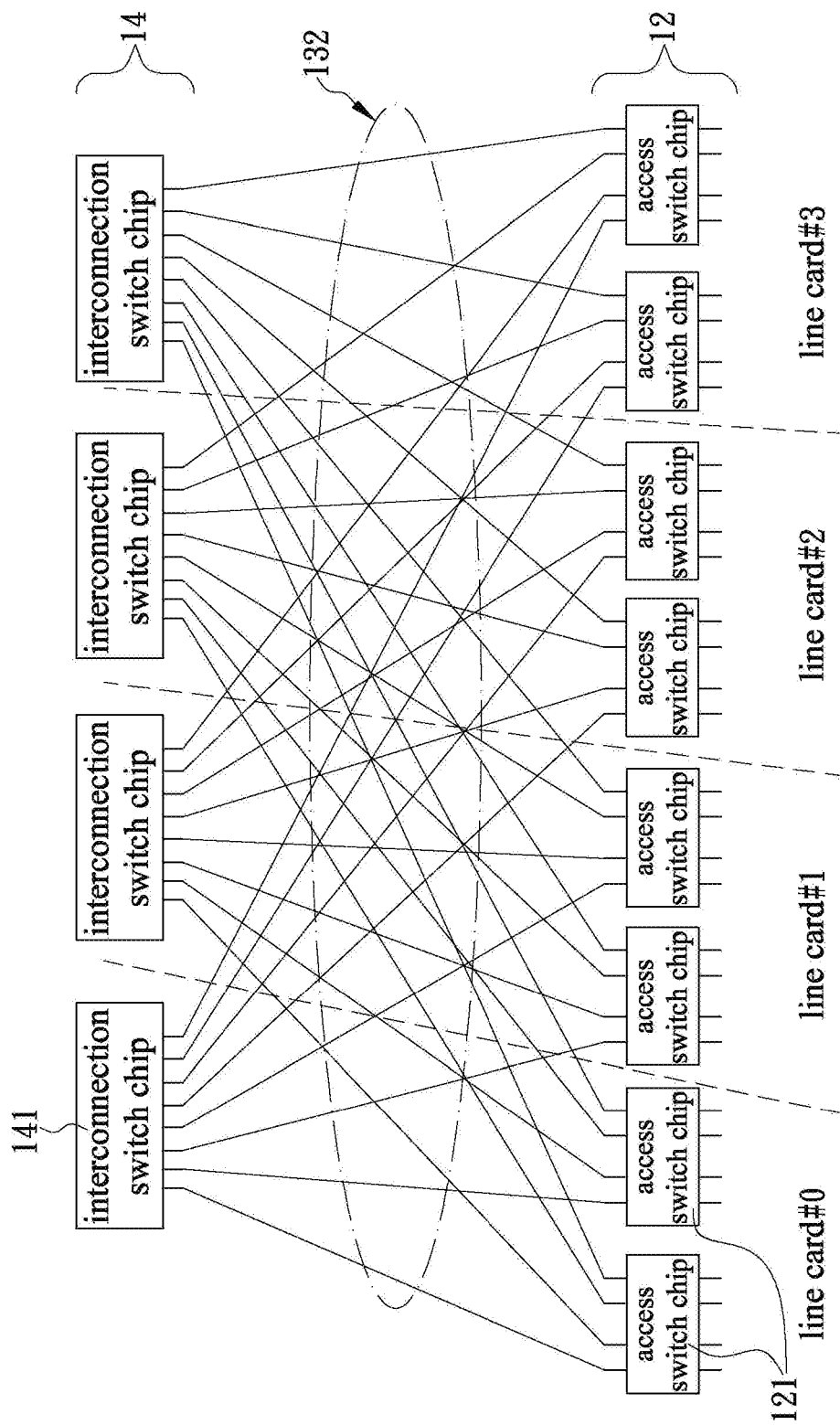
FIG. 3A is a chip connection schematic view when a traditional chassis switch is fully plugged with four line cards.
Figure 3B:
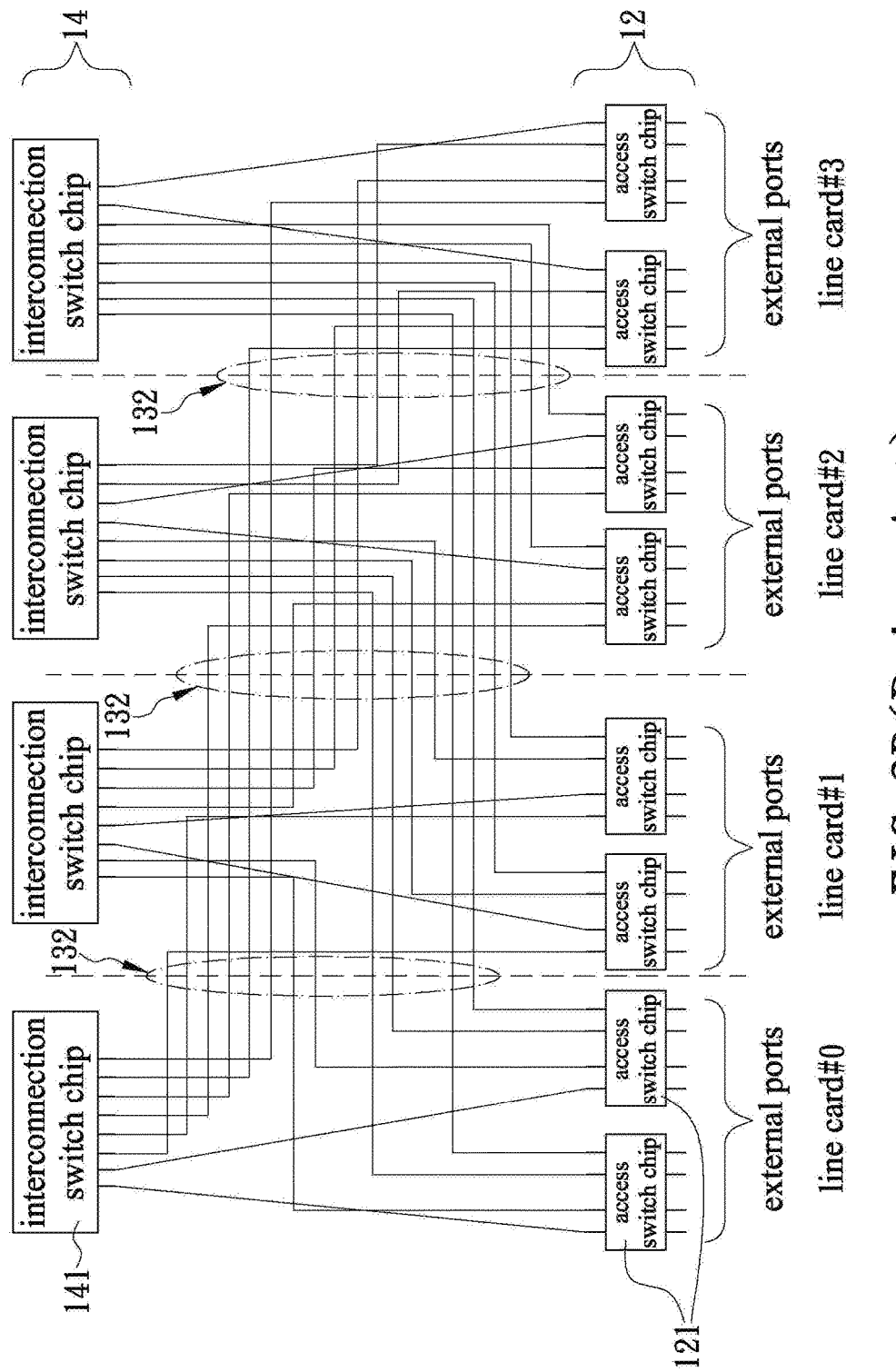
FIG. 3B is another chip connection schematic view when the traditional chassis switch is fully plugged with four line cards.
Figure 3C:
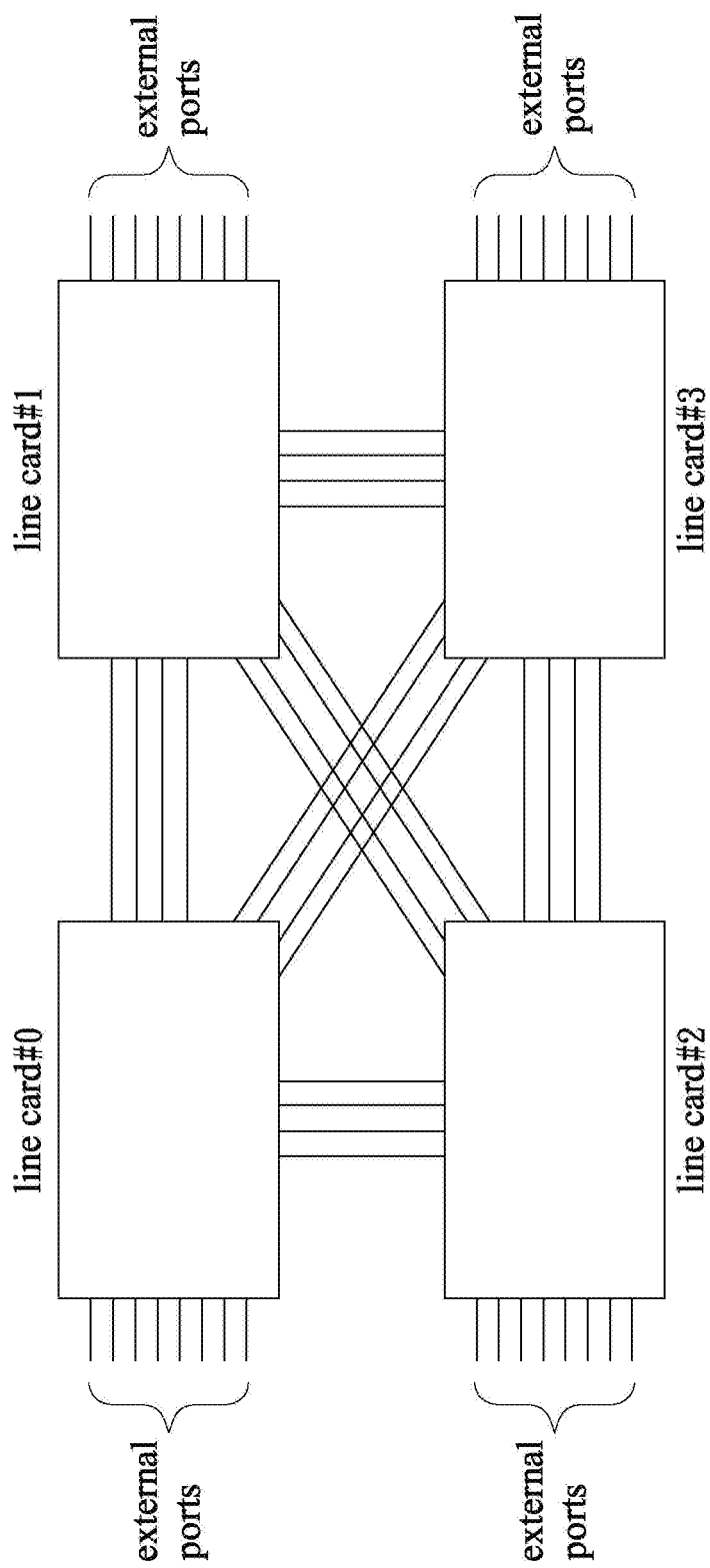
FIG. 3C is a connection schematic view when the traditional chassis switch is fully plugged with four line cards.
Figure 4A:
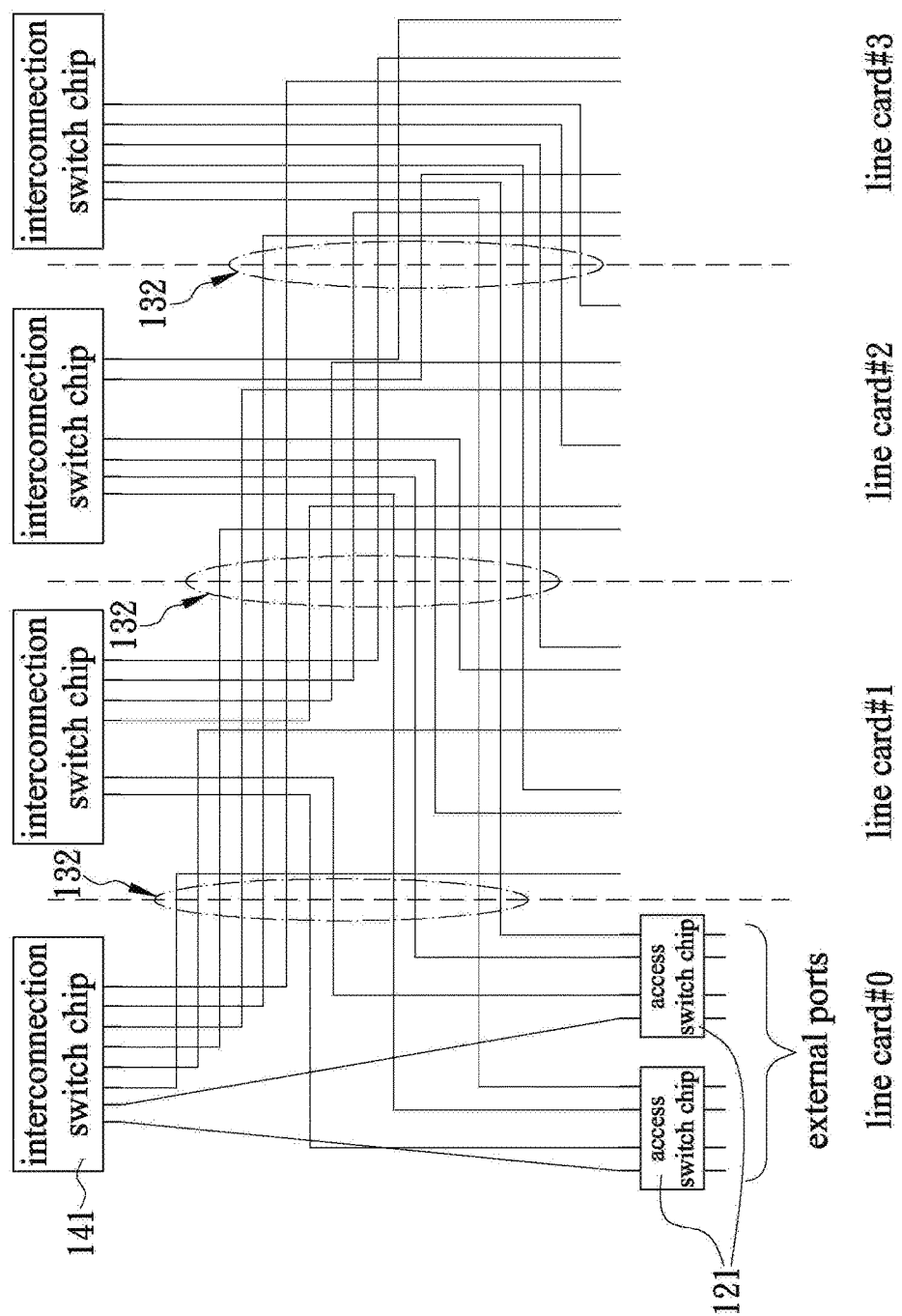
FIG. 4A is a chip connection schematic view when the traditional chassis switch is plugged with one line card only.
Figure 4B:
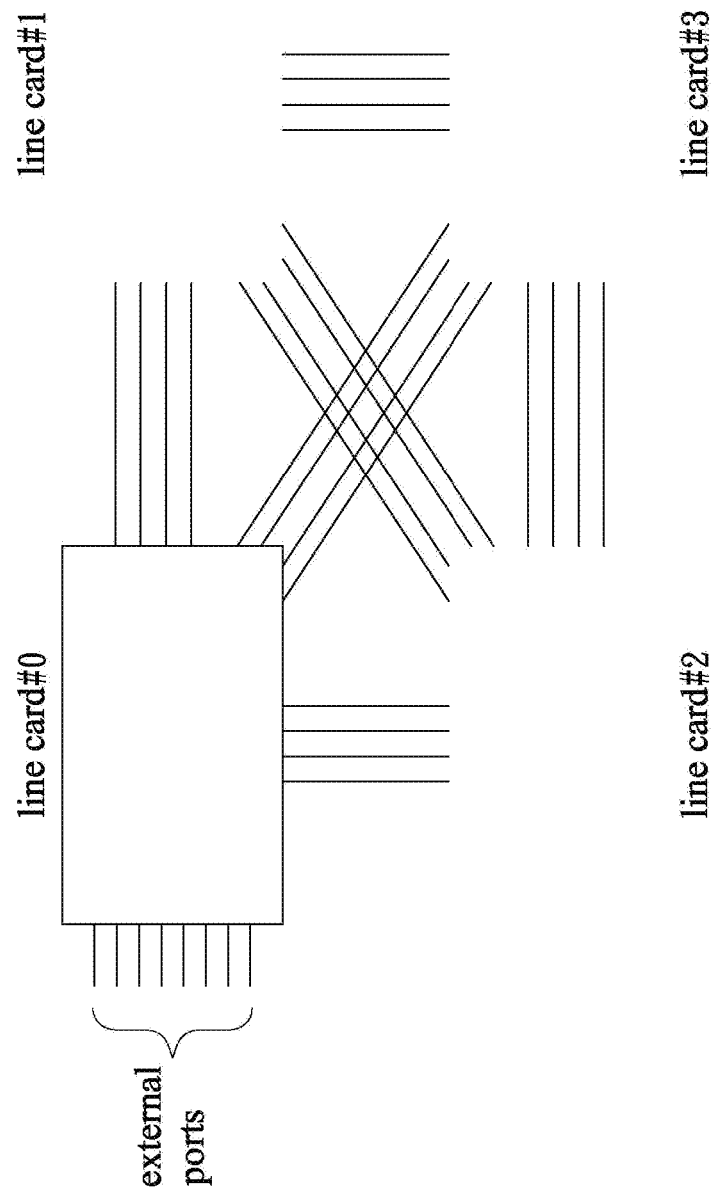
FIG. 4B is a connection schematic view when the traditional chassis switch is plugged with one line card only.
Figure 5A:
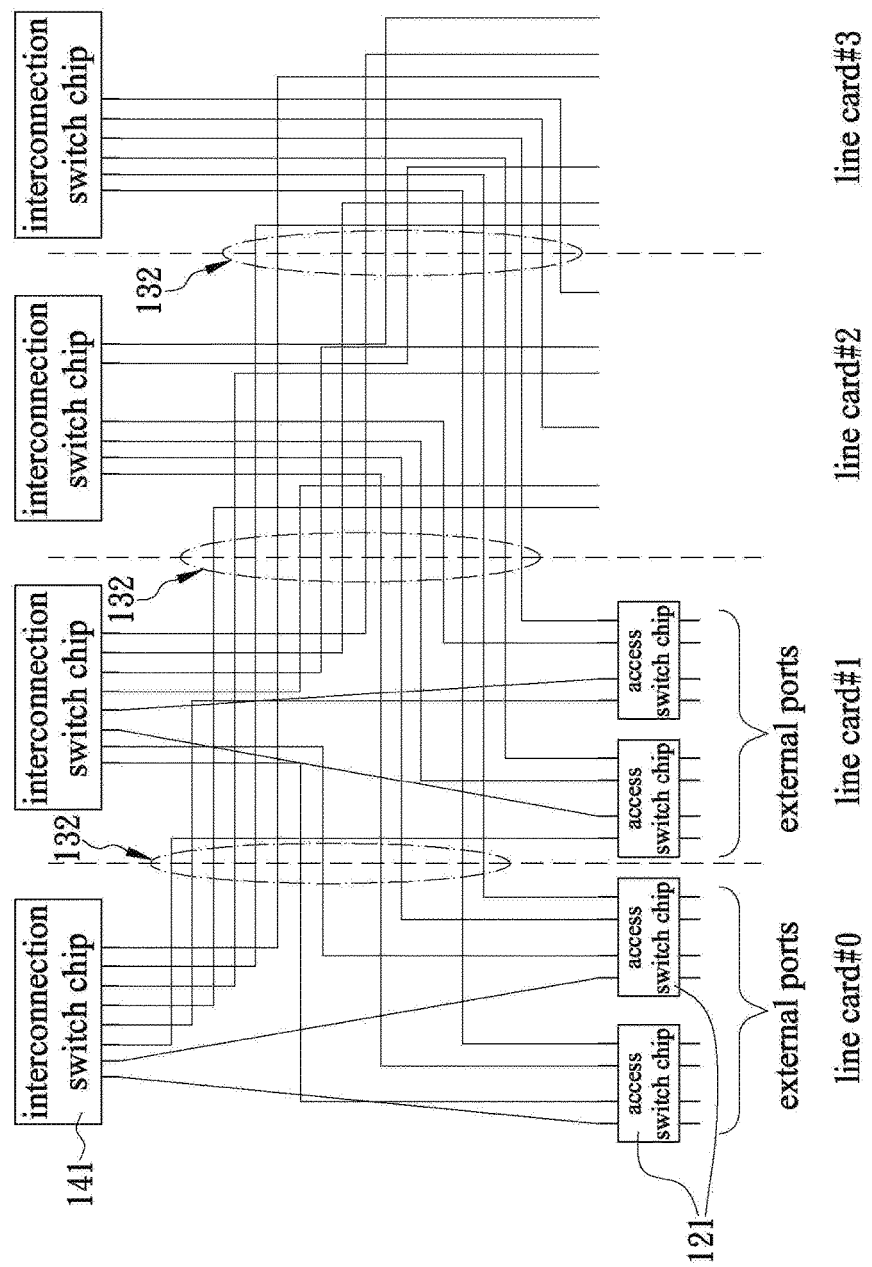
FIG. 5A is a chip connection schematic view when the traditional chassis switch is plugged with two line cards.
Figure 5B:
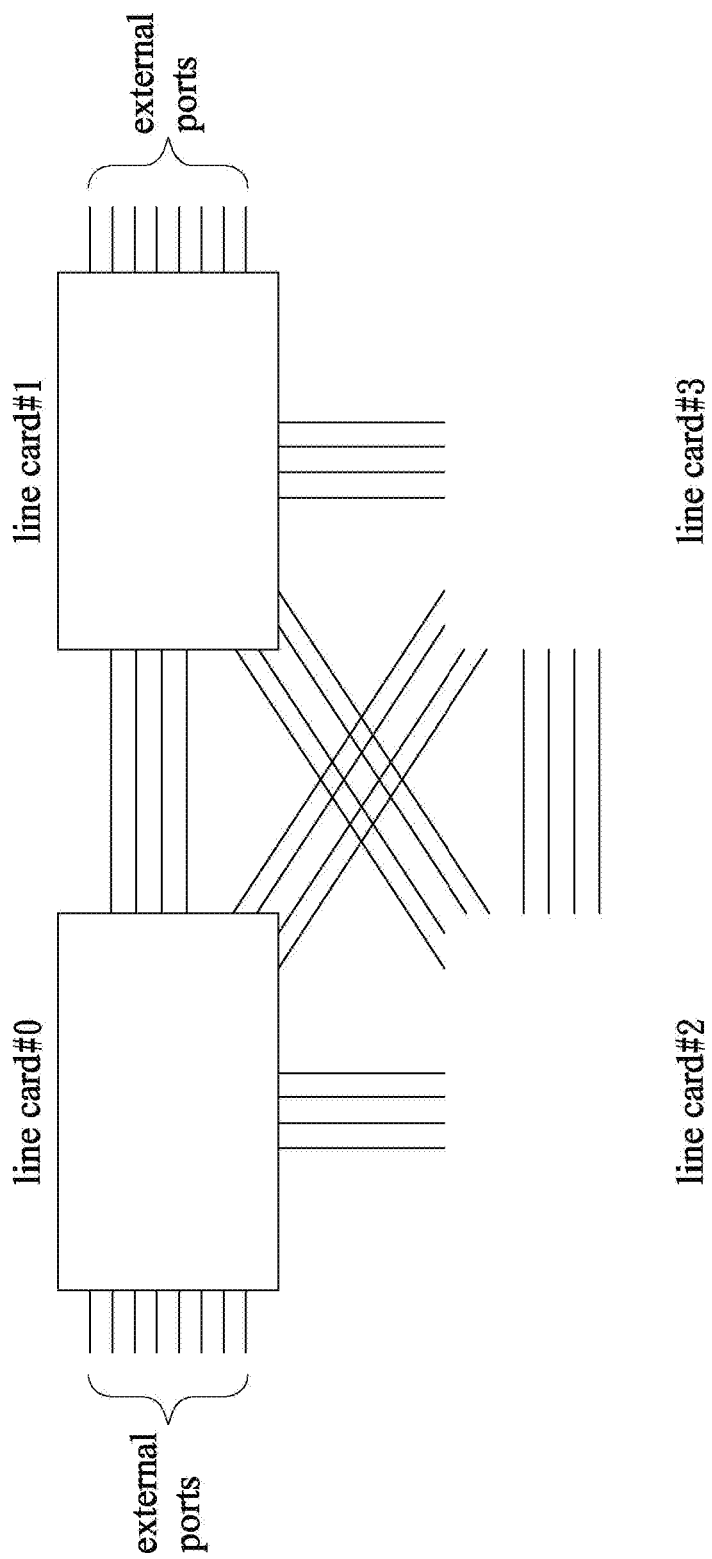
FIG. 5B is a connection schematic view when the traditional chassis switch is plugged with two line cards.
Figure 6A:
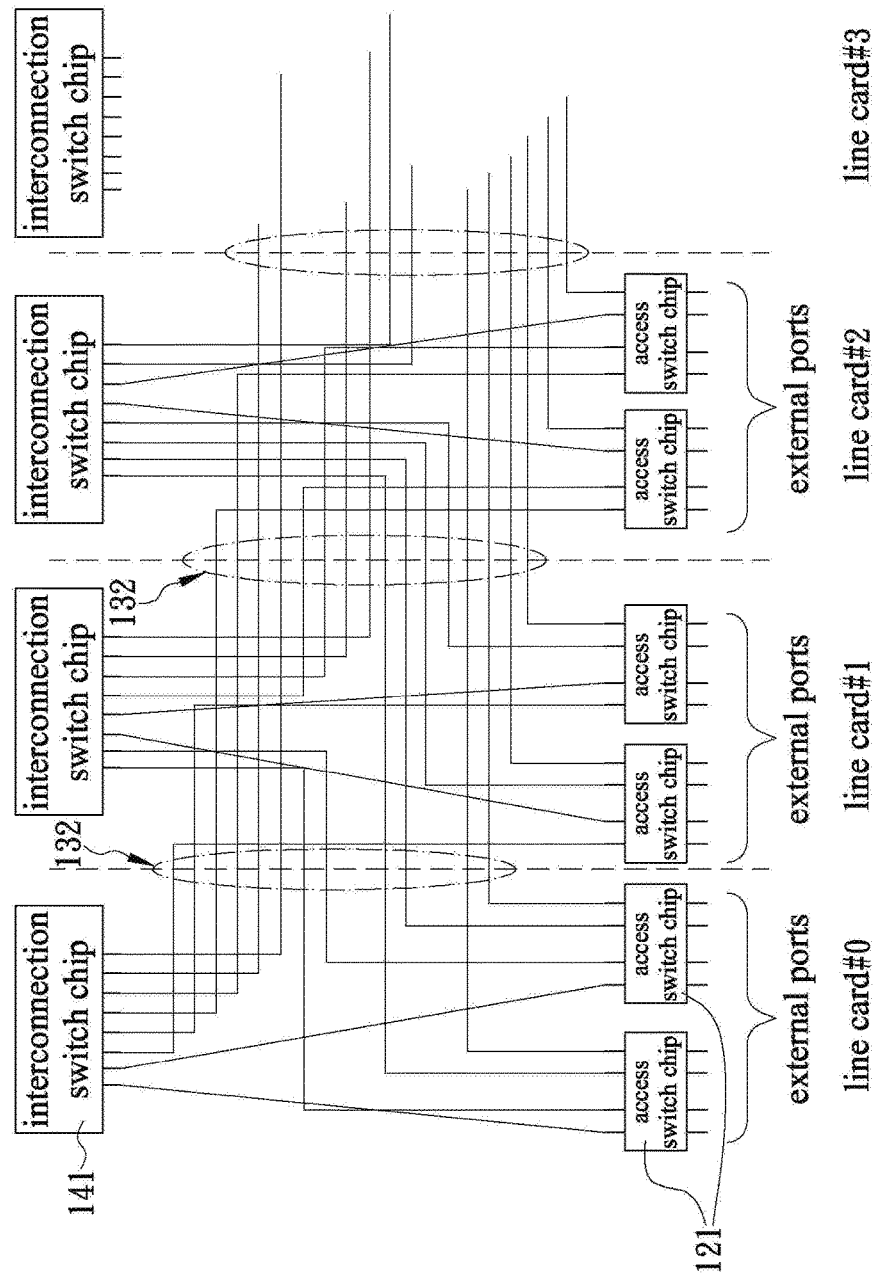
FIG. 6A is a chip connection schematic view when the traditional chassis switch is plugged with three line cards.
Figure 6B:
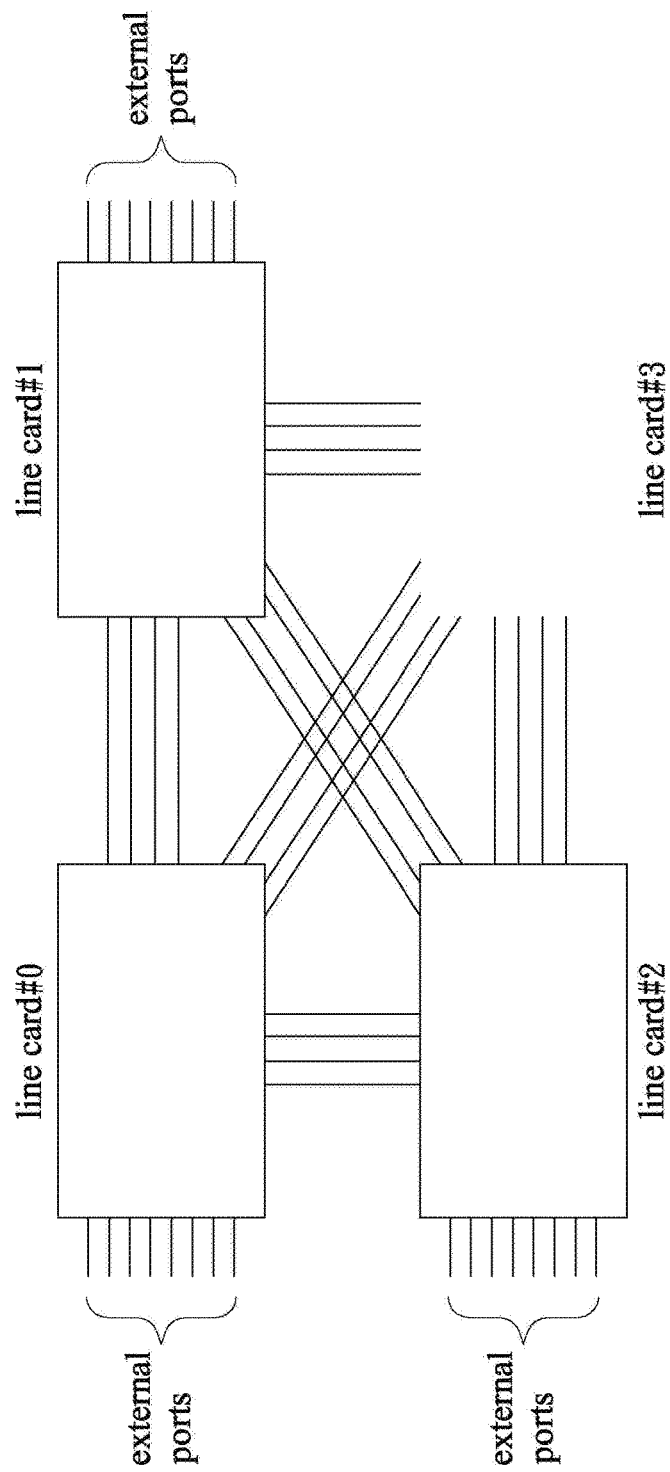
FIG. 6B is a connection schematic view when the traditional chassis switch is plugged with three line cards.

Reference will now be made in detail to the exemplary embodiments of the present invention, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

Figure 7:
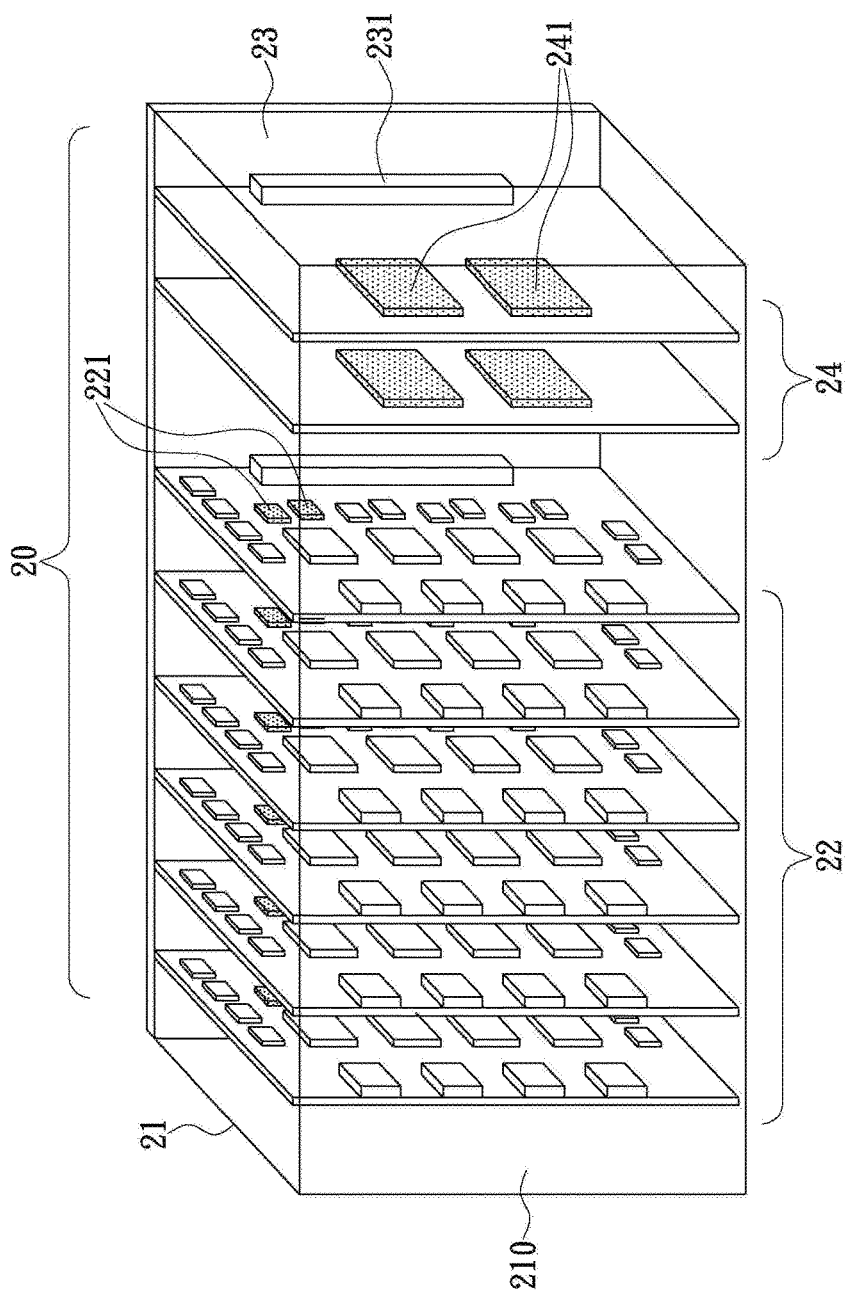
FIG. 7 is a perspective view of a preferable embodiment of the present invention.

The present invention relates to a chassis switch using a distributed backplane to interconnect line cards. Please refer to FIG. 7. In one preferable embodiment of the present invention, the chassis switch 20 may include a chassis 21, at least one line card 22, a backplane 23 and at least one switch card 24. The chassis 21 defines an accommodating space 210 therein for accommodating a designated number of line cards 22 and the designated number of switch cards 24 respectively. The backplane 23 is installed on a back side of the chassis 21, and at least one connector 231 is disposed on the backplane 23. Each of the line cards 22 may be plugged into the corresponding connector 231 via a front side of the chassis 21. Each of the line cards 22 may have an access switch chip 221 which is adapted to switch local network signals. Each of the switch cards 24 may be plugged into the corresponding connector 231 via the front side of the chassis 21 for connecting to the line cards 22 through the backplane 23. Each of the switch cards 24 has an interconnection switch chip 241 which is adapted to switch signals between internal ports of the line cards 22, and the number of the connectors 231 and the interconnection switch chips 241 is the same as the number of the line cards 22. Please refer back to FIG. 7. In the present embodiment, the connector 231 of the line card 22 plugged into the backplane 23 may enable corresponding ports of the access switch chip 221 and the interconnection switch chip 241, which were originally not connected with each other, to connect to each other by a loop (not shown in FIG. 7, but labeled in following figure), so as to enable the internal port of each line cards 20 plugged into the chassis switch to perform a local network switching function and a switching function between the line cards effectively.

Figure 8A:
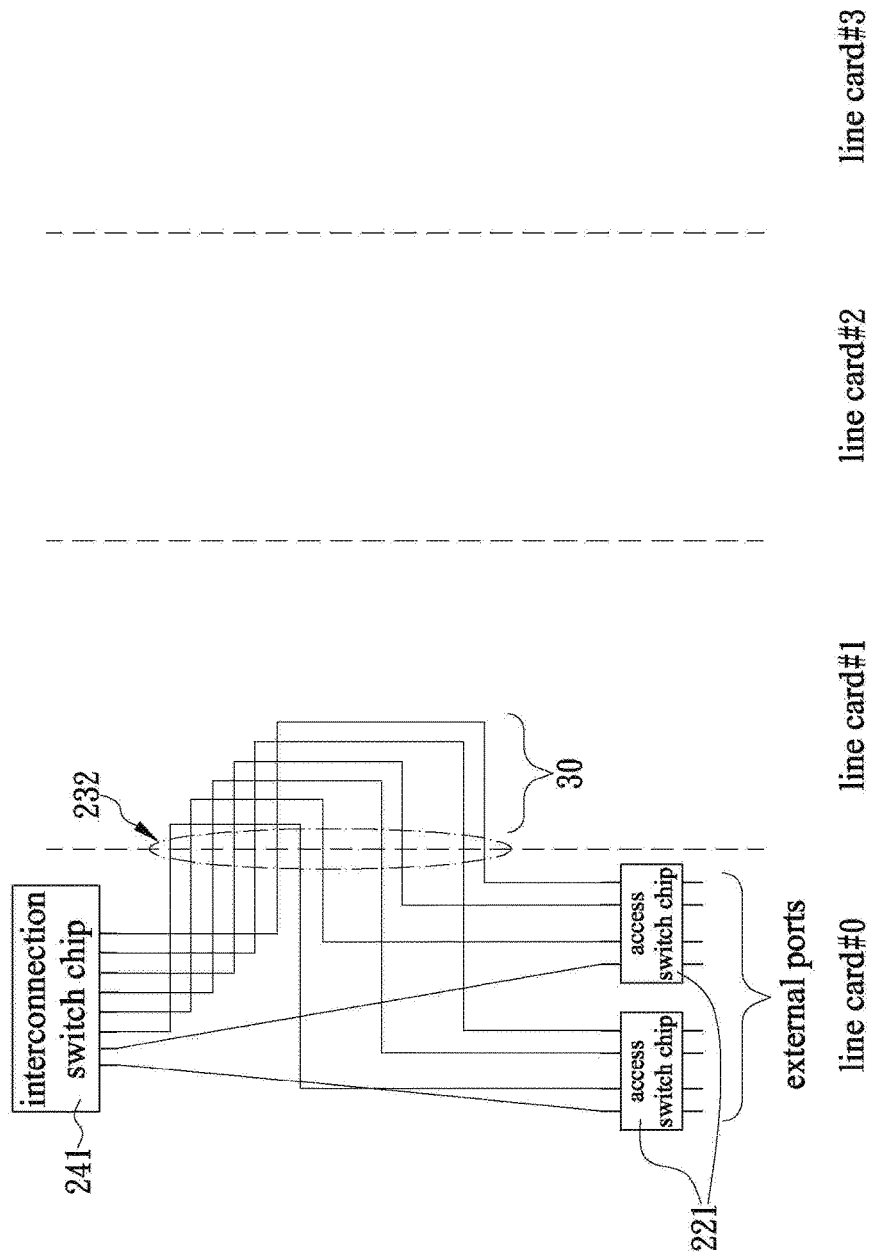
FIG. 8A is a loop connection schematic view of aforesaid embodiment when the chassis switch of aforesaid embodiment is plugged with one line card.
Figure 8B:
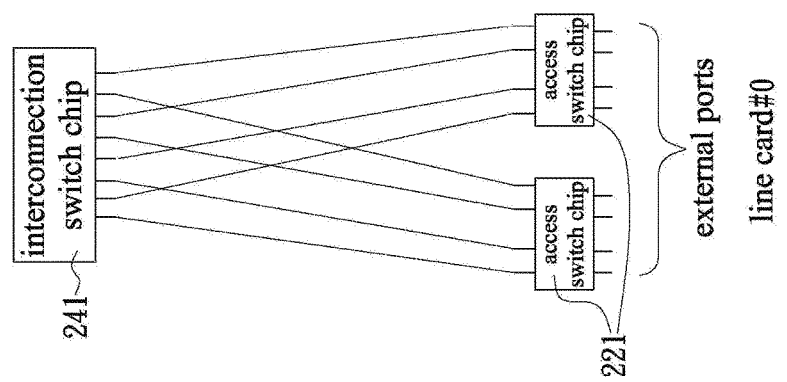
FIG. 8B is a chip connection equivalent schematic view of aforesaid embodiment when the chassis switch of aforesaid embodiment is plugged with one line card.

The chassis switch with thirty-two ports of the above-mentioned fat tree structure is taken as an example. Please refer to FIG. 7 and FIG. 8A. One switch card 24 and four line cards 22 marked as #0, #1, #2 and #3 are disposed in the accommodating space 210 of the chassis switch 20. The access switch chip 221 on each line card 22 may include a transmission circuit and a receiving circuit. Each of the transmission circuit and the receiving circuit has eight ports which are responsible for transmitting and receiving signals. Therefore, each of the line cards 22 has eight ports in total, and the four line cards 22 may form thirty-two ports in total. Each of the line cards 22 is adapted to provide a mechanism for switching the local network signals, and responsible for the switching function for I/O ports. The interconnection switch chip 241 of the switch card 24 is responsible for the signals switching between the internal ports of the line cards 22. Thus, when the user only plugs some line cards 22 into the chassis switch 20 according to an actual requirement rather than plugging the full designated number of the line cards 22, the operation of the chassis switch 20 is described as follows:

1. Please refer to FIG. 8A. When the user only plugs one line card #0 into the chassis switch 20, only two internal ports of the access switch chip 221 are connected to the interconnection switch chip 241 directly, and the connections are indicated by two straight lines in FIG. 8A. Thus, the others six internal ports of the access switch chip 221 are not connected to the interconnection switch chip 241 directly, and that are indicated by circuitous lines in FIG. 8A. The backplane signal lines 232 can be connected to each other by the loops 30, where the backplane signal line 232 are with respect to the connector 231 of the line card #0 plugged into the backplane 23. Please refer to FIG. 8B. When only one line card #0 is plugged into the chassis switch 20, only one interconnection switch chip 241 is required to be installed on the switch card 24. Then, all internal ports of the access switch chip 221 can be connected to the interconnection switch chip 241, so as to effectively perform the local network switching function and the signals switching function between the internal ports and reduce the cost and the resource waste through avoiding from installing unnecessary interconnection switch chips 241.

Figure 9A:
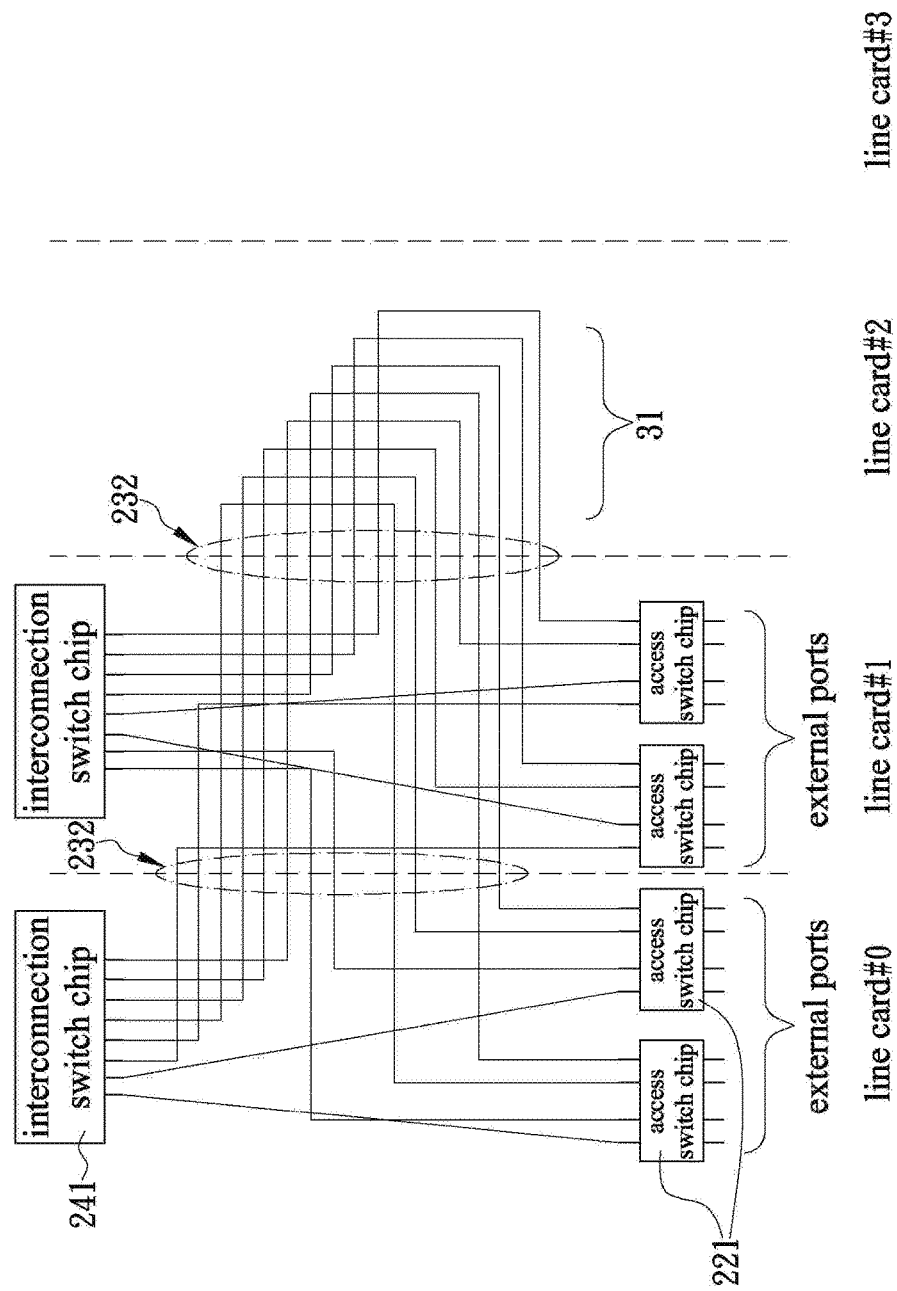
FIG. 9A is a loop connection schematic view of aforesaid embodiment when the chassis switch of aforesaid embodiment is plugged with two line cards.
Figure 9B:
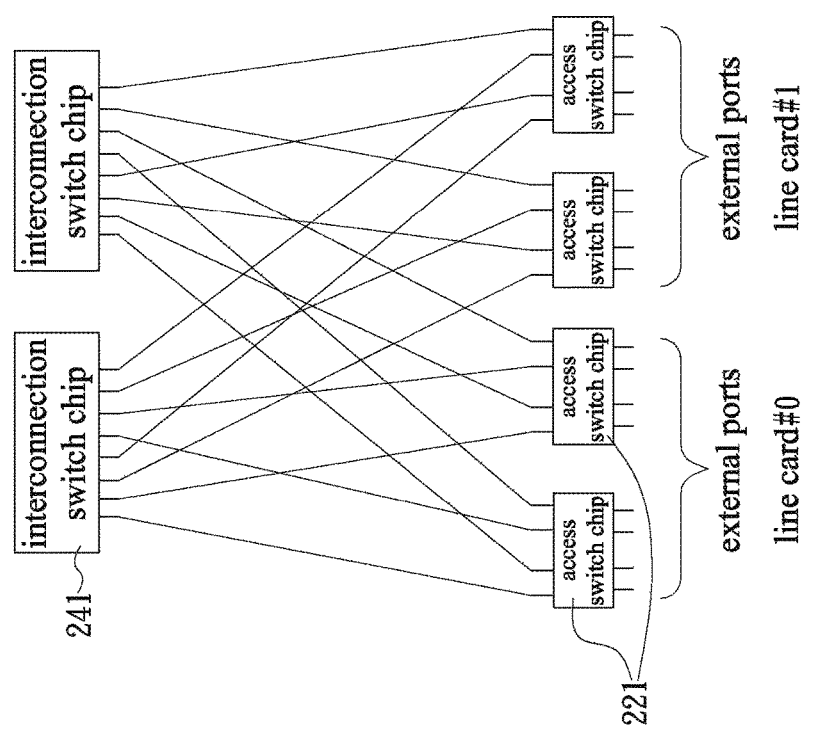
FIG. 9B is a chip connection equivalent schematic view of aforesaid embodiment when the chassis switch of aforesaid embodiment is plugged with two line cards.

2. Please refer to FIG. 9A. When the user only plugs two line cards #0 and #1 into the chassis switch 20, only two internal ports of each access switch chip 221 are connected to each interconnection switch chip 241 directly, and the connections thereof are indicated by two straight lines in FIG. 9A. The others six internal ports of each access switch chip 221 are not connected to each interconnection switch chip 241 directly, and that are indicated by circuitous lines in FIG. 9A. Thus, the backplane signal lines 232 can be connected to each other by the loops 31, where the backplane signal lines 232 are with respect to the connector 231 of the line cards #0 and #1 plugged into the backplane 23. Please refer to FIG. 9B. When the only two line cards #0 and #1 are plugged into the chassis switch 20, only two interconnection switch chips 241 are required to be installed on the switch card 24. Then, all internal ports of the access switch chip 221 can be connected to the interconnection switch chip 241, to effectively perform the local network switching function and the switching function between the line cards and reduce the cost and the resource waste through avoiding from installing unnecessary interconnection switch chips 241.

Figure 10A:
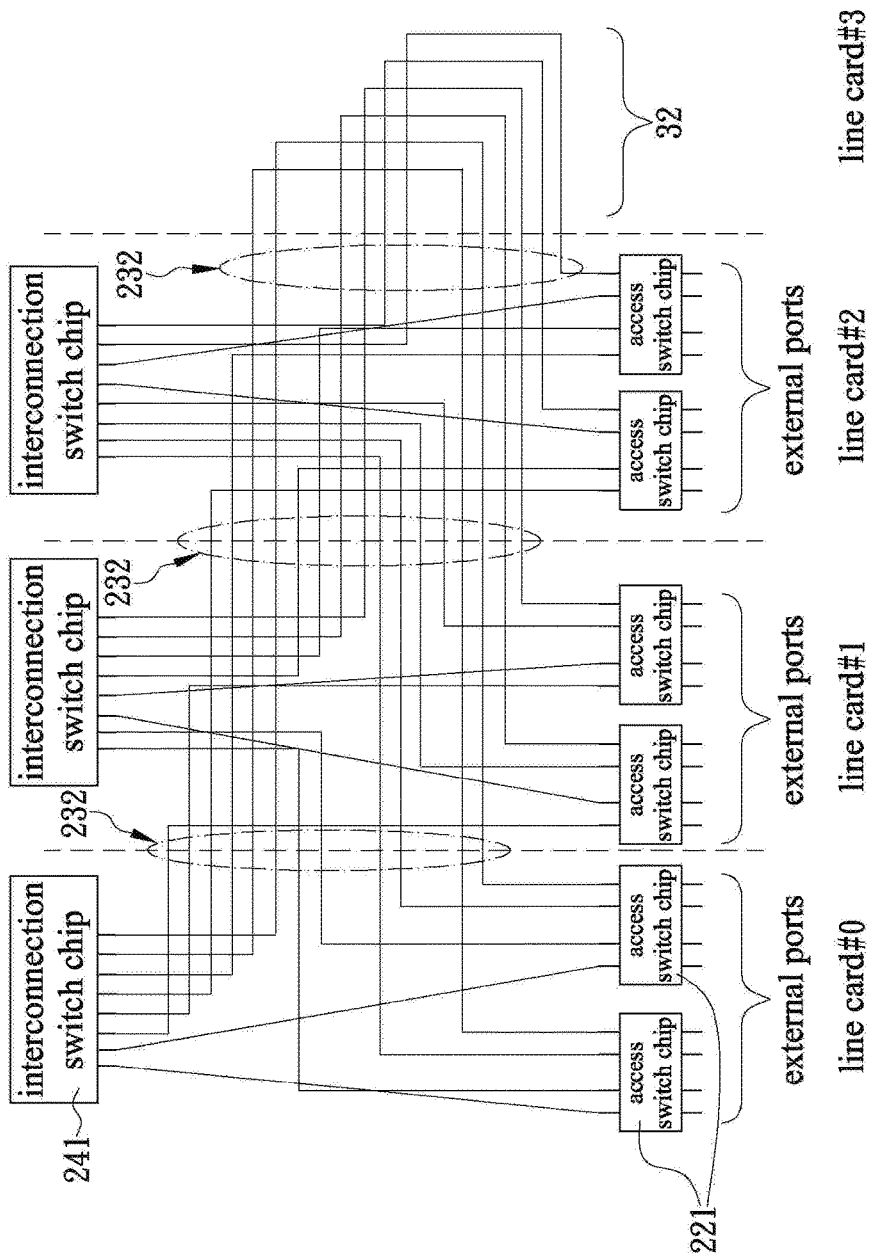
FIG. 10A is a loop connection schematic view of aforesaid embodiment when the chassis switch of aforesaid embodiment is plugged with three line cards.
Figure 10B:
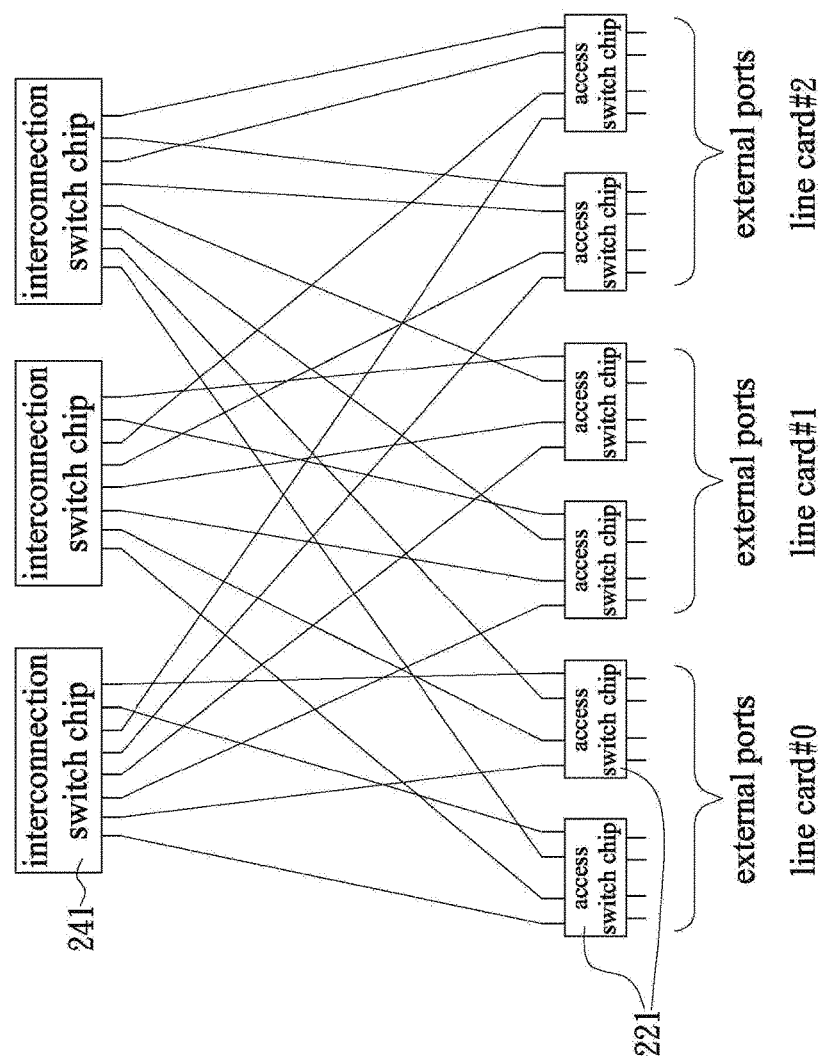
FIG. 10B is a chip connection equivalent schematic view of aforesaid embodiment when the chassis switch of aforesaid embodiment is plugged with three line cards.

3. Please refer to FIG. 10A. When the user only plugs three line cards #0, #1 and #2 into the chassis switch 20, only two internal ports of each access switch chip 221 are connected to each interconnection switch chip 241 directly, and the connections thereof are indicated by two straight lines in FIG. 10A. The others six internal ports of each access switch chip 221 are not connected to each interconnection switch chip 241 directly, and that are indicated by circuitous lines in FIG. 10A. Thus, the backplane signal lines 232 can be connected to each other by the loops 32, where the backplane signal lines 232 are with respect to the connector 231 of the line cards #0, #1 and #2 plugged into the backplane 23. Please refer to FIG. 10B. When the only three line cards #0, #1 and #2 are plugged into the chassis switch 20, only three interconnection switch chips 241 are required to be installed on the switch card 24. Then, all internal ports of the access switch chip 221 can be connected to the interconnection switch chip 241, to effectively perform the local network switching function and the switching function between the line cards and reduce the cost and the resource waste through avoiding from installing unnecessary interconnection switch chips 241.

In the aforesaid embodiment, each of the loops 30, 31 and 32 may be a circuit board having at least one circuit, and the circuit board is disposed on the backplane 23. Both two ends of each of the at least one circuit are connected to the ports of the access switch chip 221 and the interconnection switch chip 241, which were originally not connected with each other, respectively. Therefore, when the chassis switch 20 is plugged with different number of the line cards 22, the user may just change the amount of the interconnection switch chip 241 on the switch card 24 and the specification of the backplane 23. Then, all internal ports of the access switch chip 221 can be connected to the interconnection switch chip 241, so as to perform the local network switching function and the switching function between the line cards. In others embodiment of the present invention, each of the loops 30, 31 and 32 may be a cable conductor as well. Both two ends of each cable conductor can be connected to the ports of the access switch chip 221 and the interconnect switch chip 241, which were originally not connected with each other, through the connector 231 of the backplane 23, where the connector 231 is respect with the backplane signal line 232. Therefore, when the chassis switch 20 is plugged with different number of the line cards 22, the user may just change the amount of the interconnection switch chips 241 on the switch card 24, the amount of the connectors 231 on the backplane 23, and the amount and connection positions of the cable conductors, but does not need to change the specification of the backplane 23. Then, all internal ports of the access switch chip 221 can be connected to the interconnection switch chip 241 in the same way, to perform the local network switching function and the switching function between the line cards.

Figure 11:
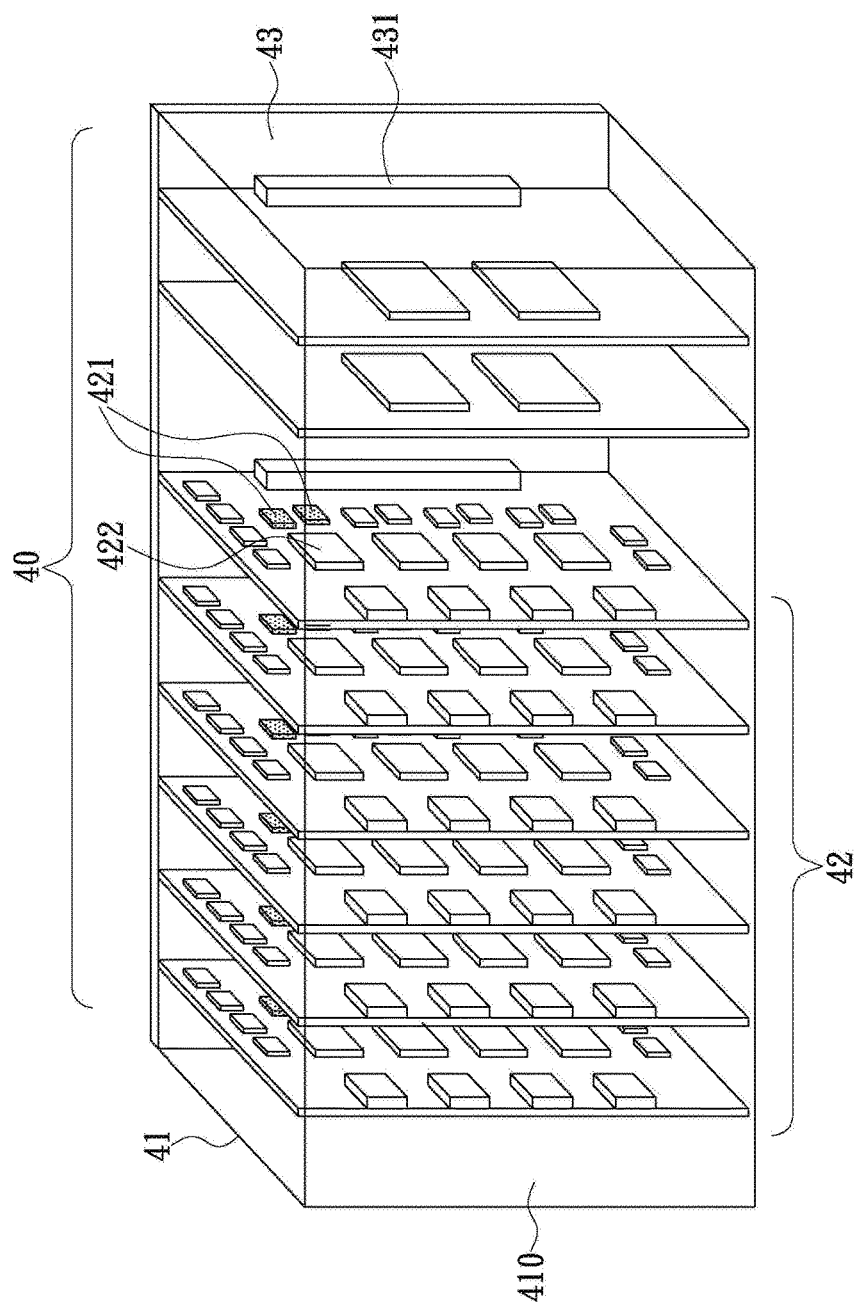
FIG. 11 is a perspective schematic view according to another embodiment of the present invention.

Please refer to FIG. 11. In another preferable embodiment, the chassis switch 40 may include a chassis 41, at least one line card 42, and a backplane 43 at least. The chassis 41 defines an accommodating space 410 therein for accommodating a designated number of line cards 42. The backplane 43 is installed on a back side of the chassis 41, and at least one connector 431 is disposed on the backplane 43. Each of the line cards 42 can be plugged into a corresponding connector 431 via a front side of the chassis 41. Each of the line cards 42 has an access switch chip 421 and an interconnect switch chip 422, the access switch chip 421 is adapted to switch the local network signals, and the interconnection switch chip 422 is adapted to switch the signals between the ports of the line cards 42. In the present embodiment, the connector 431 of the line card 42 plugged into the backplane 43 may enable the corresponding ports of the access switch chip 421 and the interconnection switch chip 422, which were originally not connected with each other, to connect to each other by a loop (not shown, please refer to the loops 30, 31 and 32 shown in FIGS. 8A, 8B, 9A, 9B, 10A and 10B respectively), to enable each of the line cards 40 plugged into the chassis switch to perform the local network switching function and the switching function between the line cards effectively. Thus, the chassis switch 40 may use the circuits 30, 31 and 32 of the backplane 43 to enable the internal ports of the line cards 42 plugged on the distributed backplane to interconnect to each other, so as to realize the local network switching function and the switching function between the line cards and meet the user's requirement by implementing the chassis switch at the lowest construction cost.

Please refer back to FIG. 7 and FIG. 11. In others embodiments of the present invention, a designated number of the connectors 231, 431 may be preset on the backplane 23, 43 of the chassis switch 20, 40, and the loops 30, 31, 32 may be added on the corresponding connectors 231, 431 according to the amount of the line cards 22, 42 actually plugged into the backplane 23, 43. Thus, without changing the backplane 23, 43, all internal ports of the access switch chip 221 can be connected to the interconnection switch chip 241, so as to perform the local network switching function and the switching function between the line cards.

The above-mentioned descriptions represent merely the exemplary embodiment of the present invention, without any intention to limit the scope of the present invention thereto. Various equivalent changes, alternations or modifications based on the claims of present invention are all consequently viewed as being embraced by the scope of the present invention.

What is claimed is:

1. A chassis switch, comprising:
 a chassis defining an accommodating space, wherein a designated number of line cards and the designated number of switch cards are disposed in the accommodating space;
 a backplane installed on a back side of the chassis and having a plurality of connectors disposed thereon;
 at least one line card plugged into one of the plurality of connectors corresponding thereto via a front side of the chassis, wherein each of the at least one line card has an access switch chip adapted to switch local network signals;
 at least one switch card plugged into one of the plurality of connectors corresponding thereto via the front side of the chassis and connected to the at least one line card through the backplane, wherein each of the at least one switch card has an interconnection switch chip adapted to switch the signals between ports of the at least one line card, and an amount of the interconnection switch chip is equal to that of the at least one line card; and
 a loop adapted to connect the corresponding ports of the access switch chip and the interconnect switch chip respectively through the connectors of the at least one line card disposed on the backplane, so as to enable each of the at least one line card plugged into the chassis switch to perform a local network switching function and a switching function between the at least one line card; wherein the loop is a circuit board, at least one circuit is disposed on the circuit board, and two ends of each of the at least one circuit are connected to the corresponding ports of the access switch chip and the interconnection switch chip, respectively.

2. A chassis switch, comprising:
 a chassis defining an accommodating space, wherein a designated number of line cards are disposed in the accommodating space;
 a backplane installed on the back side of the chassis, wherein a plurality of connectors are disposed on the backplane;
 at least one line card plugged into one of the plurality of connectors corresponding thereto via a front side of the chassis, wherein each of the at least one line card has an access switch chip and an interconnect switch chip, the access switch chip is adapted to switch local network signals, and the interconnection switch chip is adapted to switch the signals between ports of the at least one line card; and a loop adapted to connect the corresponding ports of the access switch chip and the interconnect switch chip respectively through the connectors of the at least one line card disposed on the backplane, so as to enable each of the at least one line card plugged into the chassis switch to perform a local network switching function and a switching function between the at least one line card; wherein the loop is a circuit board, the circuit board has at least one circuit, and two ends of each of the at least one circuit are connected to the corresponding ports of the access switch chip and the interconnection switch chip, respectively.

3. A chassis switch, comprising:

a chassis defining an accommodating space, wherein a designated number of line cards and the designated number of switch cards are disposed in the accommodating space;

a backplane installed on the back side of the chassis, wherein the designated number of connectors are disposed on the backplane;

at least one line card plugged into one of the connectors corresponding thereto via a front side of the chassis, wherein each of the at least one line card has an access switch chip adapted to switch local network signals;

at least one switch card plugged into one of the connectors corresponding thereto via the front side of the chassis and connected to the at least one line card through the backplane, wherein each of the at least one switch card has an interconnection switch chip adapted to switch the signals between ports of the at least one line card, and an amount of the interconnection switch chip is equal to that of the at least one line card; and a loop adapted to connect the corresponding ports of the access switch chip and the interconnection switch chip respectively through the connectors of the at least one line card disposed on the backplane, so as to enable each of the at least one line card plugged into the chassis switch to perform a local network switching function and a switching function between the at least one line card; wherein the loop is a circuit board, the circuit board has at least one circuit, and two ends of each of the at least one circuit are connected to the corresponding ports of the access switch chip and the interconnection switch chip, respectively.

4. A chassis switch, comprising:

a chassis defining an accommodating space, wherein a designated number of line cards are disposed in the accommodating space;

a backplane installed on a back side of the chassis, and the designated number of connectors is disposed on the backplane;

at least one line card plugged into one of the connectors corresponding thereto via a front side of the chassis, wherein each of the at least one line card has an access switch chip and an interconnection switch chip, the access switch chip is adapted to switch local network signals, and the interconnection switch chip is adapted to switch the signals between ports of the at least one line card; and a loop adapted to connect the corresponding ports of the access switch chip and the interconnection switch chip respectively through the connectors of the at least one line card disposed on the backplane, so as to enable each of the at least one line card plugged into the chassis switch to perform a local network switching function and a switching function between the at least one line card; wherein the loop is a circuit board, the circuit board has at least one circuit, and two ends of each of the at least one circuit are connected to the corresponding ports of the access switch chip and the interconnection switch chip, respectively.

* * * * *